(12) United States Patent
Kano

(10) Patent No.: US 8,873,195 B2
(45) Date of Patent: Oct. 28, 2014

(54) LIBRARY DEVICE, ACCESSOR, AND METHOD OF POSITIONING FOR LIBRARY DEVICE

(75) Inventor: Yoko Kano, Tokyo (JP)

(73) Assignee: NEC Embedded Products, Ltd., Tokyo (JP)

( * ) Notice: Subject to any disclaimer, the term of this patent is extended or adjusted under 35 U.S.C. 154(b) by 0 days.

(21) Appl. No.: 13/877,130

(22) PCT Filed: Jun. 29, 2011

(86) PCT No.: PCT/JP2011/064952
§ 371 (c)(1),
(2), (4) Date: Mar. 29, 2013

(87) PCT Pub. No.: WO2012/042997
PCT Pub. Date: Apr. 5, 2012

(65) Prior Publication Data
US 2013/0194700 A1    Aug. 1, 2013

(30) Foreign Application Priority Data
Sep. 30, 2010 (JP) ................................. 2010-221318

(51) Int. Cl.
*G11B 15/68* (2006.01)
(52) U.S. Cl.
CPC .............. *G11B 15/682* (2013.01); *G11B 15/68* (2013.01); *G11B 15/6835* (2013.01); *G11B 15/6885* (2013.01)
USPC ........................................................ 360/92.1

(58) Field of Classification Search
CPC ....... G11B 15/68; G11B 15/682; G11B 23/50; G11B 23/502
USPC ......................................................... 360/92.1
See application file for complete search history.

(56) References Cited

U.S. PATENT DOCUMENTS

2011/0038075 A1 *  2/2011  Compton et al. ............. 360/92.1

FOREIGN PATENT DOCUMENTS

| JP | 2-094157 A | 4/1990 |
|---|---|---|
| JP | 6-251472 A | 9/1994 |
| JP | 8-180547 A | 7/1996 |
| JP | 2005-108414 A | 4/2005 |

OTHER PUBLICATIONS

International Search Report for PCT/JP2011/064952 dated Oct. 18, 2011.

* cited by examiner

*Primary Examiner* — Allen T Cao
(74) *Attorney, Agent, or Firm* — Sughrue Mion, PLLC

(57) ABSTRACT

A library device including the magazine which provides with a plurality of cells for storing the recording medium and the accessor which is positioned at a position facing a target cell in the magazine to pick up the recording medium from the cell or store the recording medium in the cell, the accessor includes a first position correction unit and a second position correction unit which positions the accessor at the position facing the target cell and when the first position correction unit fail to position the accessor at the position facing the target cell, the second position correction unit position the accessor at the position facing the target cell.

9 Claims, 5 Drawing Sheets

LIBRARY DEVICE, ACCESSOR, AND METHOD OF POSITIONING FOR LIBRARY DEVICE

This is a National Stage Application of Application No. PCT/JP2011/064952 filed Jun. 29, 2011, claiming priority based on Japanese Patent Application No. 2010-221318 filed Sep. 30, 2010, the contents of all of which are incorporated herein by reference in their entirety.

TECHNICAL FIELD

The present invention relates to a library device and more particularly relates to a library device in which a position of a medium grasping device (hereinafter, referred to as an accessor) which picks up a recording medium from a medium storing shelf or stores the recording medium in the medium storing shelf can be adjusted to the most suitable position and the recording medium can be smoothly positioned, an accessor, and a method of positioning for a library device.

BACKGROUND ART

As is well known, a magnetic tape device which uses a magnetic tape as a recording medium is one of external storage devices of a computer. As a mainstream magnetic tape device, a magnetic tape cartridge in which a magnetic tape with a width of several inches is included, the magnetic tape is automatically pulled out from a reel in a case, and it is loaded is used extensively. The required quantity of the magnetic tape cartridges is loaded in a magnetic tape library device (hereinafter, referred to as a library device) and the magnetic tape cartridge is selectively loaded into a magnetic recording/reproducing device (hereinafter, referred to as a drive) to read and write data.

The library device includes a medium storing shelf (hereinafter, referred to as a magazine) in which a plurality of cells for storing a recording medium are provided, an accessor which is positioned to a position facing a target cell in the magazine to pick up the recording medium from the facing cell that is the target cell or store the recording medium in the facing cell, and a drive which reads/writes data from/into the recording medium supplied by the accessor.

In this kind of library device, it is required to improve the storage capacity per unit volume as a basic performance. To meet this requirement, the cells in the magazine have to be densely disposed. In this case, highly accurate relative positioning between the cell in the magazine and the accessor is required.

On the other hand, variation in the relative positional relationship between the cell in the magazine and the accessor which is caused by tolerance of each of the components of which the library device is composed and an assembly error occurs. There is a possibility that the variation becomes large by a secular change of the above-mentioned components or the like. For this reason, in order to ensure highly accurate relative positioning between them, an adjustment is required before the device is actually operated and after the magazine or the like is added or replaced.

In order to adjust the relative position between the cell in the above-mentioned magazine and the accessor, a method disclosed in PLT 1 is commonly used, by which when the recording medium cannot be normally moved (picked up from/stored in the cell), the accessor is moved many times from a reference position to other positions until a position at which the recording medium can be normally picked up from and stored in the cell is found, wherein the accessor is moved by a predetermined amount for each movement.

CITATION LIST

Patent Literature

[PTL 1]
Japanese Patent Application Laid-Open No. 1996-180547

SUMMARY OF INVENTION

Technical Problem

However, when the relative positional displacement between the cell in the magazine and the accessor is large, the reference position itself of the accessor disclosed in PLT 1 is displaced greatly. For this reason, even when the accessor is positioned many times from the reference position to other positions to pick up the recording medium from the cell or store the recording medium in the cell, as a result, there is a case in which the recording medium cannot be normally positioned (picked up from/stored in the cell).

Accordingly, an object of the present invention is to solve the above-mentioned problem and provide a library device in which the recording medium can be normally positioned (picked up from/stored in the cell) even when the relative positional displacement between the cell in the magazine and the accessor is large, an accessor, and a method of positioning for library device.

Solution to Problem

The present invention is a library device including a magazine which provides with a plurality of cells for storing a recording medium and an accessor which is positioned to a position facing a target cell in the magazine to pick up the recording medium from the cell or store the recording medium in the cell, wherein the accessor includes a first position correction means and a second position correction means for moving the accessor to a position facing a target cell and when the first position correction means fail to move the accessor at the position facing the target cell, the second position correction means move the accessor at the position facing the target cell.

Advantageous Effects of Invention

The library device according to the present invention has an effect in which even when the relative positional displacement between the cell in the magazine and the accessor is large, the recording medium can be normally positioned (picked up from/stored in the cell).

DESCRIPTION OF EMBODIMENTS

Figure 1:
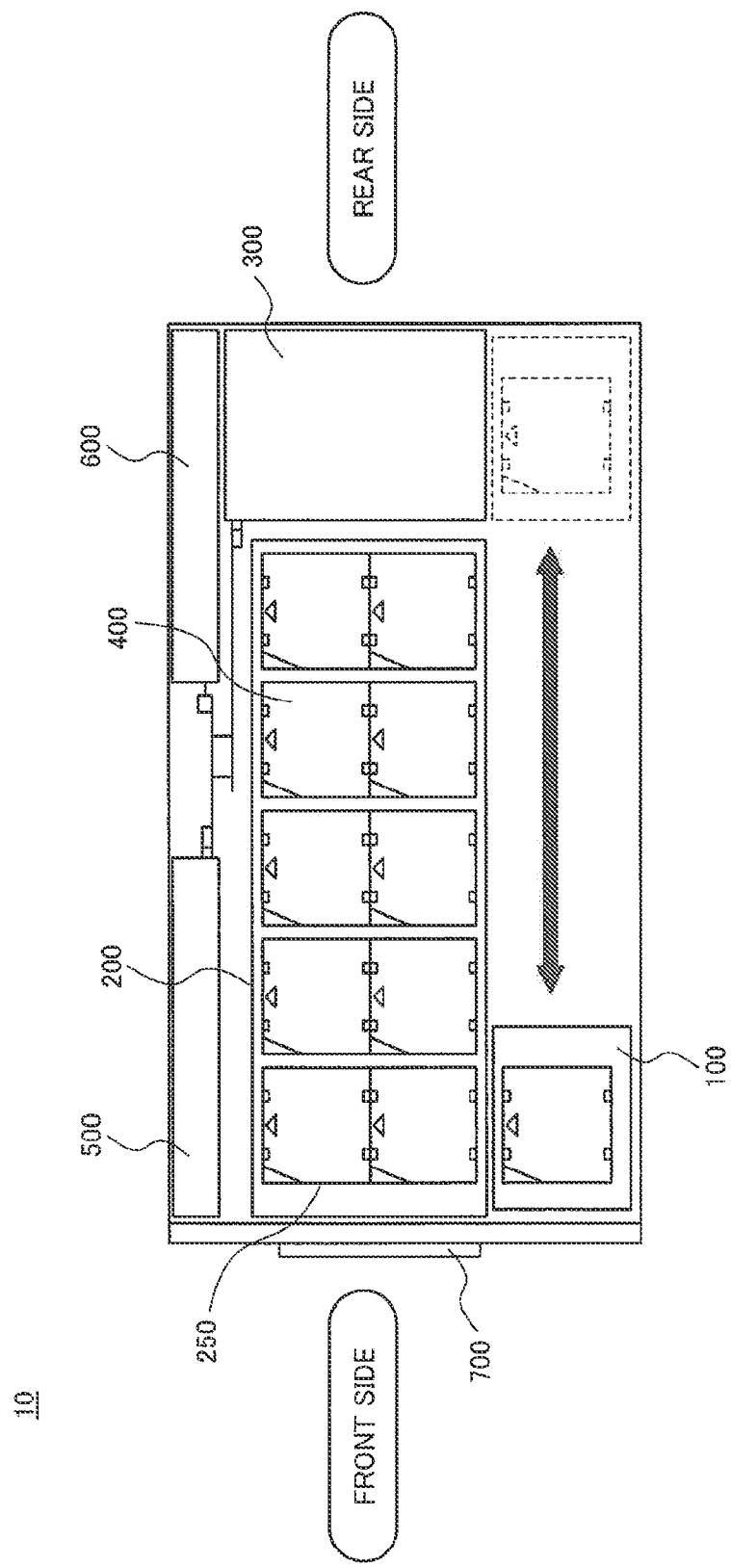
FIG. 1 is a structural drawing (plain view) of a library device according to an exemplary embodiment of the present invention.

An exemplary embodiment of the present invention will be described below in detail with reference to the drawing.

FIG. 1 is a structural drawing (plain view) of a library device according to the exemplary embodiment of the present invention. A library device 10 includes a magazine 200 which provides with a plurality of cells 250 for storing a recording medium 400, an accessor 100 which is positioned to a position facing the target cell 250 in the magazine 200 to pick up the recording medium 400 from the facing cell 250 or store the recording medium 400 in the facing cell 250, a drive 300 which reads/writes data from/into the recording medium 400 supplied by the accessor 100, a control unit 500 which integrally controls each unit, a power supply unit 600 which supplies a power to each unit, and an operation panel 700 which is used to perform a manual operation and solve an error problem.

A maximum of two recording media 400 can be stored in the cells 250 shown in FIG. 1. The magazine 200 is composed of a plurality of the cells 250. Further, the structure of the library device according to the exemplary embodiment of the present invention is not limited to the structure shown in FIG. 1 and the present invention can be realized as an exemplary embodiment other than the exemplary embodiment described in the drawing accompanying this specification.

Figure 2:
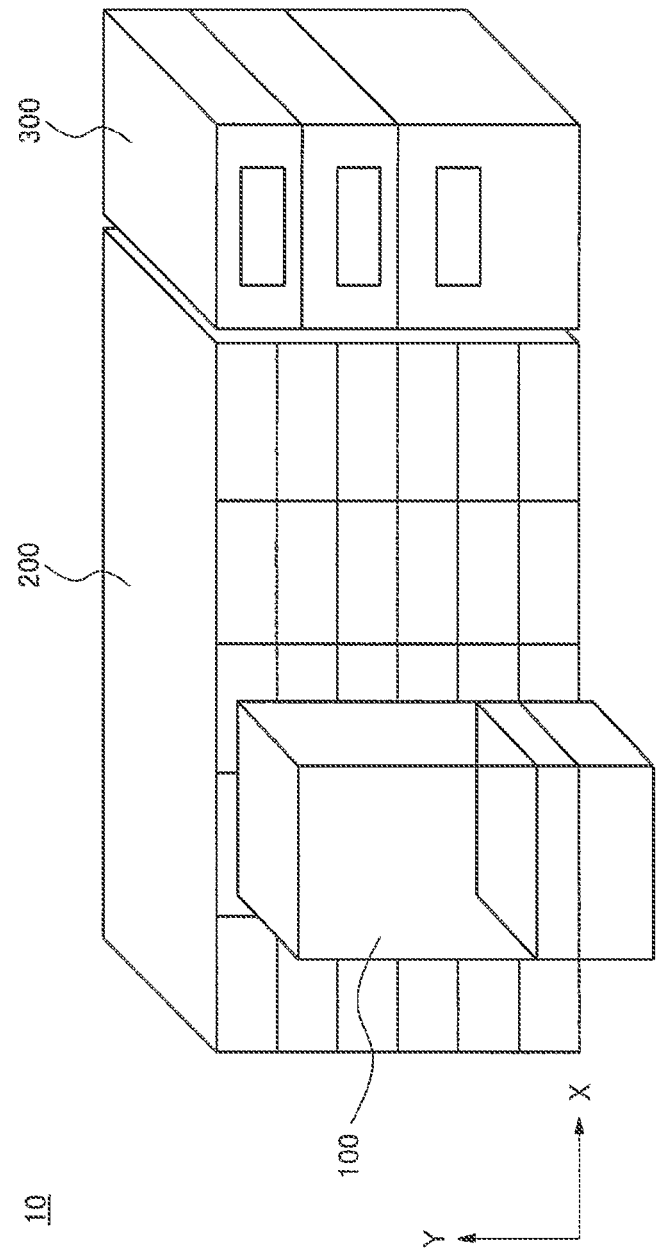
FIG. 2 is a structural drawing (external view) of a library device according to an exemplary embodiment of the present invention.

FIG. 2 is a structural drawing (external view) of the library device according to the exemplary embodiment of the present invention. In an example shown in FIG. 2, one magazine 200 is composed of five cells 250 and six magazines 200 are stacked up. The accessor 100 can be positioned in an X direction and can be positioned in a Y direction while holding the recording medium 400. The accessor 100 can pick up/store the recording medium 400 from/in each of all the cells 250. Further, the structure of the library device according to the exemplary embodiment of the present invention is not limited to the structure shown in FIG. 2 and the present invention can be realized as an exemplary embodiment other than the exemplary embodiment described in the drawing accompanying this specification.

Figure 3:
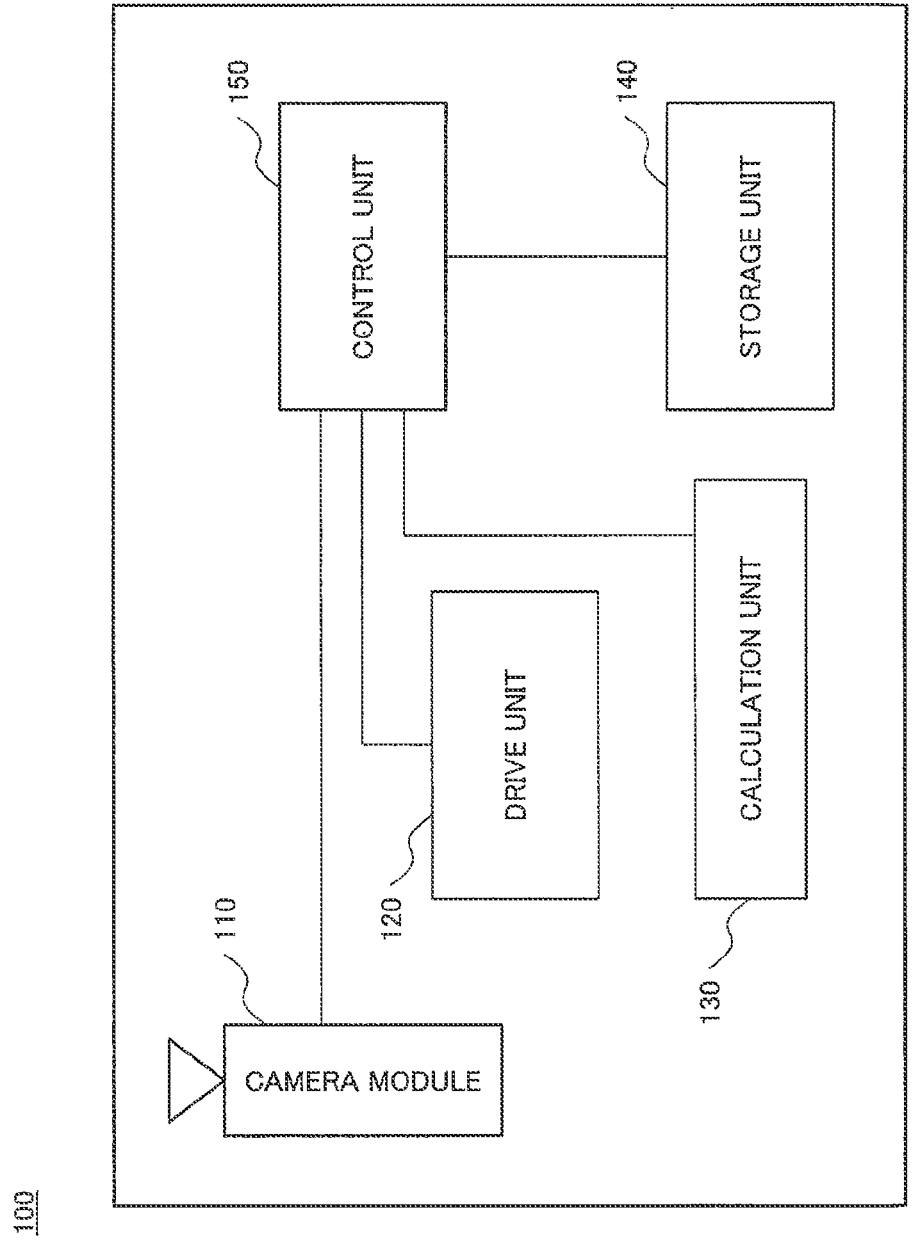
FIG. 3 is a block diagram of an accessor according to the exemplary embodiment of the present invention.

FIG. 3 is a block diagram of the accessor according to the exemplary embodiment of the present invention. The accessor 100 includes a camera module 110 which reads a position of a mark or the like put on the cell 250, a drive unit 120 which positions the accessor 100 in the X direction and the Y direction, a calculation unit 130 which performs the calculation of positioning, a storage unit 140 which stores a value related to positioning, and a control unit 150 which integrally controls each unit. Further, the configuration of the accessor according to the exemplary embodiment of the present invention is not limited to the configuration shown in FIG. 3 and the present invention can be realized as an exemplary embodiment other than the exemplary embodiment described in the drawing accompanying this specification.

Figure 4:
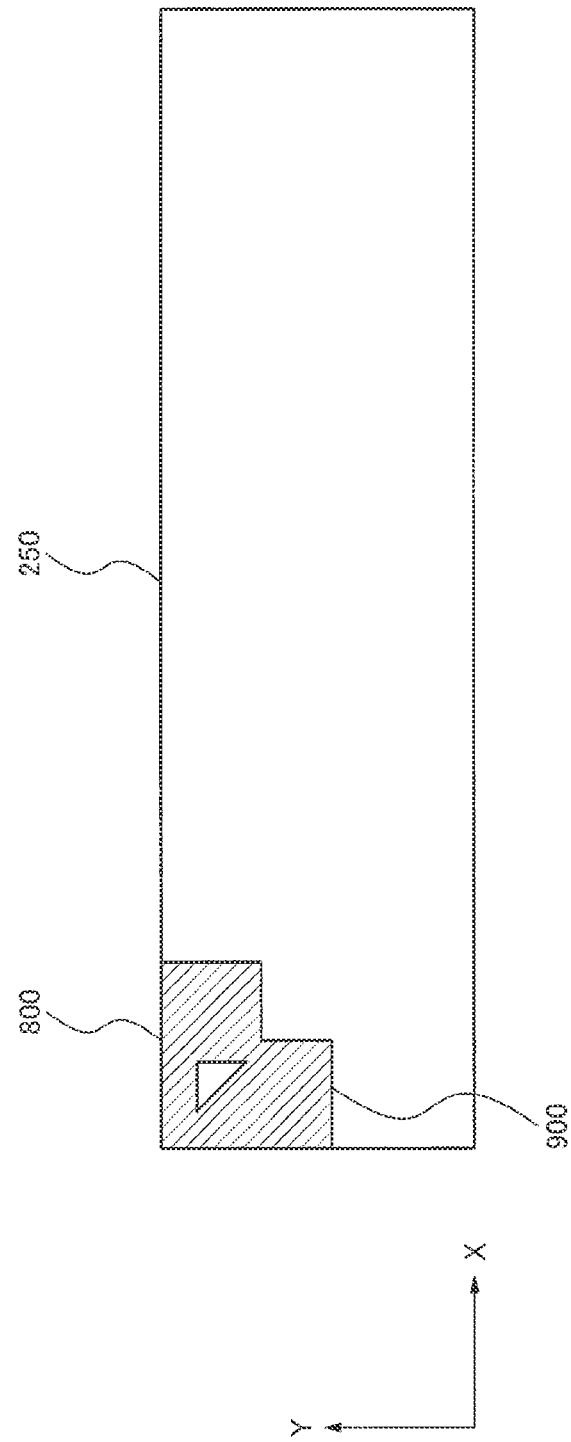
FIG. 4 is a structural drawing of a cell according to the exemplary embodiment of the present invention.

FIG. 4 is a structural drawing of a cell according to the exemplary embodiment of the present invention. The cell 250 includes a latch lever 900 on which a target mark 800 required for grasping a relative position between the cell 250 and the accessor 100 is put. Further, the target mark 800 may be put on a portion other than the latch lever 900 of the cell 250 if the target mark 800 can be read by the camera module 100 when the accessor 100 is positioned.

Figure 5:
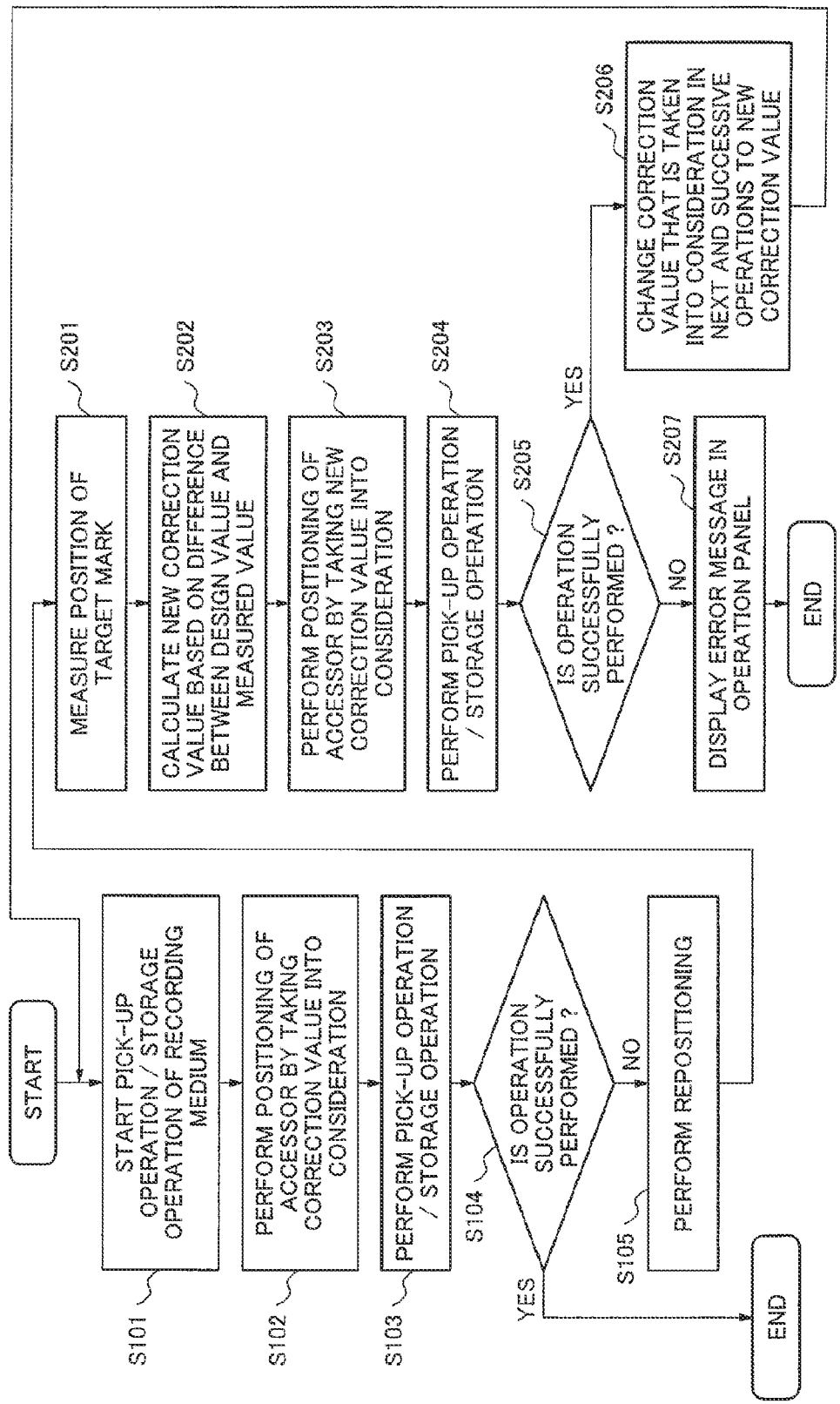
FIG. 5 is a flowchart for showing a positioning operation of an accessor according to the exemplary embodiment of the present invention.

FIG. 5 is a flowchart for showing the positioning operation of the accessor according to the exemplary embodiment of the present invention.

The accessor 100 is positioned to a position facing the target cell 250 in the magazine 200 and starts to pick up the recording medium 400 from the facing cell 250 or store the recording medium 400 in the facing cell 250. (step S101).

Here, the positioning of the accessor 100 is performed based on a value that is set at the time of delivery and stored in the storage unit 140 of the accessor 100 (step S102).

Next, the accessor 100 picks up the recording medium 400 from the facing cell 250 or stores the recording medium 400 in the facing cell 250 at the position determined by the positioning operation (step S103).

When the accessor 100 performs a pick-up operation or a storage operation of the recording medium 400, it is determined whether or not the pick-up operation or the storage operation is successfully performed (step S104). When the operation is successfully performed (YES in step S104), the process ends. When the operation fails (NO in step S104), repositioning is performed (step S105).

The repositioning is an operation performed when the operation fails or another problem occurs, in which the accessor 100 is positioned by a predetermined amount from the last operation position at which the operation fails and operated again. In this case, when the operation fails again after the accessor 100 is positioned one time, the accessor 100 can be positioned and operated plural times while changing the amount of movement or the direction of movement until the operation succeeds. Specifically, in FIG. 2, when the operation still fails after the accessor 100 is positioned by a predetermined amount in the X direction (+), the accessor 100 is positioned by a predetermined amount in the X direction (−) and operated. After performing these operations, if the operation still fails, the accessor 100 is positioned in the Y direction and operated. Further, the amount of movement or the direction of movement can be set appropriately.

A correction possible range of the position correction using repositioning is smaller than that of the position correction using a camera module (described later). However, when the position correction using repositioning is performed, an error between the actual position and the position after the correction is small statistically and the position correction can be performed with higher accuracy. Therefore, when it is expected that a change in usage environment of the library device is small and the relative positional displacement between the cell in the magazine and the accessor is small, the positioning can be more efficiently achieved by performing the position correction using repositioning before performing the position correction using a camera module.

However, when the operation still fails after the repositioning is performed certain times, the process proceeds on to step S201. Further, when the operation succeeds after performing the repositioning a few times, the position correction ends. The operation fails when the relative positional displacement between the accessor 100 and the magazine 200 is increased mainly by a secular change. Further, in the repositioning, the accessor 100 is positioned in one of the X direction (in FIG. 1, a depth direction of the device when viewed from the front-side of the device) and the Y direction (in FIG. 1, a height direction of the device when viewed from the front-side of the device) and operated. Therefore, when the relative positional displacement occurs in both the X direction and the Y direction, there is a possibility that the operation fails.

Accordingly, the accessor 100 measures the target mark 800 put on the latch lever 900 of the cell 250 by the camera module 110 provided in the accessor 100 (step S201). At that time, the camera module 110 measures the positional displacements in both the X direction and the Y direction at the same time.

The control unit 150 of the accessor 100 instructs the calculation unit 130 to compare the measured value of the target mark 800 obtained by the above-mentioned measurement with a design value (the X direction and the Y direction) of the target mark 800 stored in the storage unit 140 and calculate a correction value (hereinafter, referred to as a new correction value) from the difference (step S202).

The control unit 150 of the accessor 100 instructs the driving unit 120 to position the accessor 100 by taking the new correction value calculated by the above-mentioned calculation unit 130 into consideration. Further, the new correction value is stored in the storage unit 140.

The accessor 100 is positioned based on the above-mentioned new correction value and operates to pick up the recording medium 400 from the cell 250 or store the recording medium 400 in the cell 250 (step S204).

When the accessor 100 performs the pick-up operation or the storage operation of the recording medium 400, it is determined whether or not the pick-up operation or the storage operation is successfully performed (step S205).

When the operation is successfully performed (YES in step S205), the correction value that is taken into consideration in the next and successive operations is changed to the new correction value (step S206). When the operation fails (NO in step S205), an error message is displayed in the operation panel 700 and a manual adjustment or the like is performed by an operator or the like (step S207). Further, when the operation fails (NO in step S205), the repositioning may be performed (this is the same as step S105).

By using the present invention, even when the relative positional displacement between the cell in the magazine and the accessor is large, the recording medium can be normally positioned (picked up from/stored in the cell). Additionally, position correction means which perform a target mark measurement using the camera module have an effect in the positioning of the accessor as a complementary function of position correction means using repositioning.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

Further, this application is based upon and claims the benefit of priority from Japanese patent application No. 2010-221318, filed on Sep. 30, 2010, the disclosure of which is incorporated herein in its entirety by reference.

REFERENCE SIGNS LIST

10 library device
100 accessor
110 camera module
120 drive unit
130 calculation unit
140 storage unit
150 control unit
200 magazine
250 cell
300 drive
400 recording medium
500 control unit
600 power supply unit
700 operation panel
800 target mark
900 latch lever

The invention claimed is:

1. A library device comprising:
   a magazine which provides with a plurality of cells, wherein each of a cell of the plurality of cells stores a recording medium; and
   an accessor which is positioned at a position facing a target cell of the plurality of cells in said magazine to pick up said recording medium from said target cell or store said recording medium in said target cell, wherein
   said accessor includes a first position correction unit and a second position correction unit which positions said accessor at the position facing said target cell and when the first position correction unit fails to position said accessor at the position facing said target cell, the second position correction unit will position said accessor at the position facing said target cell.

2. The library device according to claim 1, wherein
   said first position correction unit performs correction with high accuracy compared to said second position correction unit.

3. The library device according to claim 1, wherein
   said second position correction unit has a wide correction range compared to said first position correction unit.

4. The library device according to claim 1 wherein said first position correction unit performs a positioning of said accessor by moving said accessor by a predetermined amount in a direction of movement of said accessor from a vicinity of the position facing said cell and when the positioning fails, the direction of movement of said accessor or the amount of movement from the vicinity of the position facing said cell is changed and the positioning of said accessor is performed again.

5. The library device according to claim 1 wherein said second position correction unit performs the positioning of said accessor based on a comparison between a result of measurement of a target mark put on said cell by a camera module mounted in said accessor and a design value of said target mark.

6. The library device according to claim 5 wherein
   said target mark is put on a latch lever of said cell.

7. An accessor comprising:
   a first position correction unit; and
   a second position correction unit for positioning the accessor to a position facing a cell of a library device, wherein
   when said first position correction unit fails to position said accessor at the position facing said target cell, said second position correction unit will position said accessor at the position facing said target cell.

8. A method of positioning for a library device which includes
   a magazine which provide with a plurality of cells, wherein each of a cell of the plurality of cells stores a recording medium and an accessor which is positioned to a position facing a target cell in said magazine to pick up said recording medium from said target cell or store said recording medium in said target cell,
   wherein said accessor includes a first position correction unit and a second position correction unit for positioning said accessor at the position facing said target cell, comprising:
   positioning said accessor at the position facing said target cell by said second position correction unit when said first position correction unit means fail to position said accessor at the position facing said target cell.

9. A library device comprising:

a magazine which provides with a plurality of cells, wherein each of a cell of the plurality of cells stores a recording medium; and an accessor which is positioned at a position facing a target cell in said magazine to pick up said recording medium from said target cell or store said recording medium in said target cell, wherein said accessor includes a first position correction means and a second position correction means for positioning said accessor at the position facing said target cell and when the first position correction means fail to position said accessor at the position facing said target cell, the second position correction means position said accessor at the position facing said target cell.

\* \* \* \* \*